March 3, 1964 J. MORKOSKI ETAL 3,123,153
DISK HARROW WING LOCKING DEVICE
Filed Jan. 29, 1962
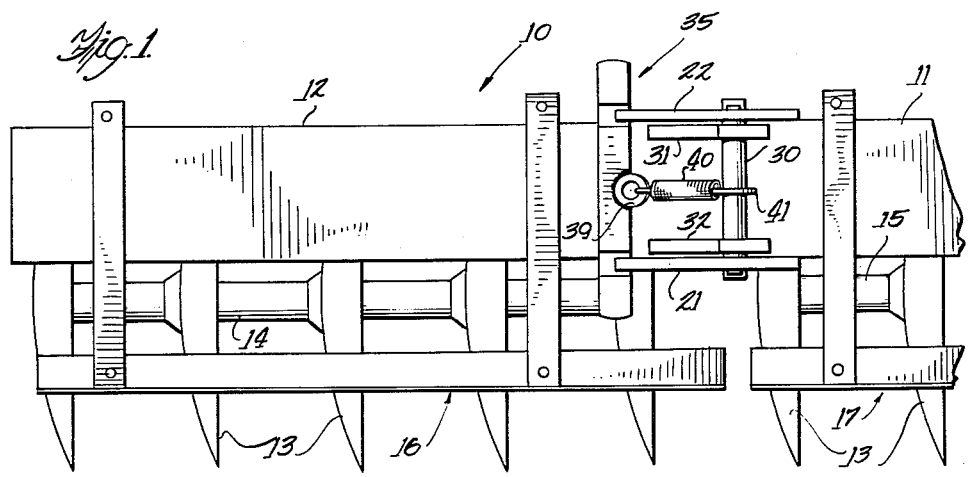
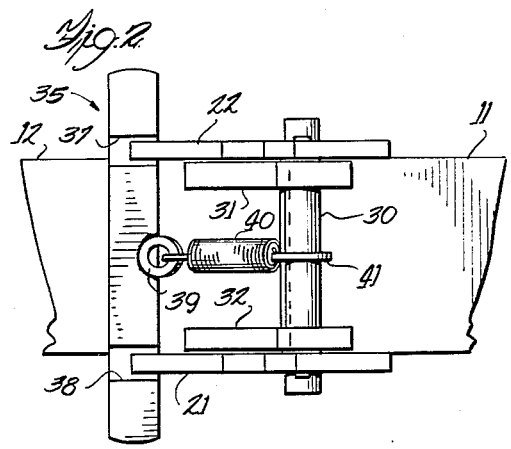
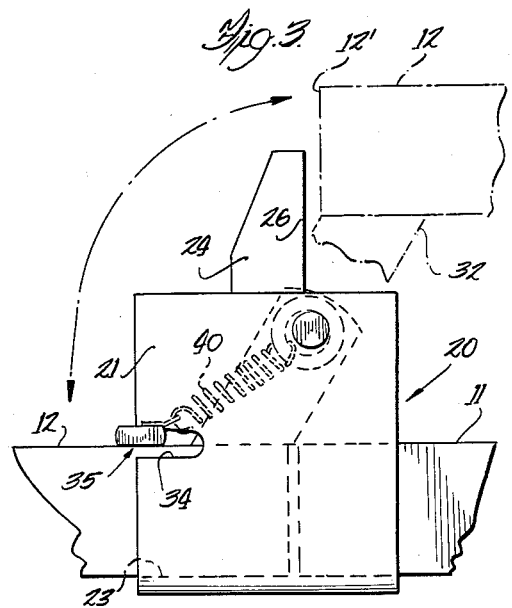
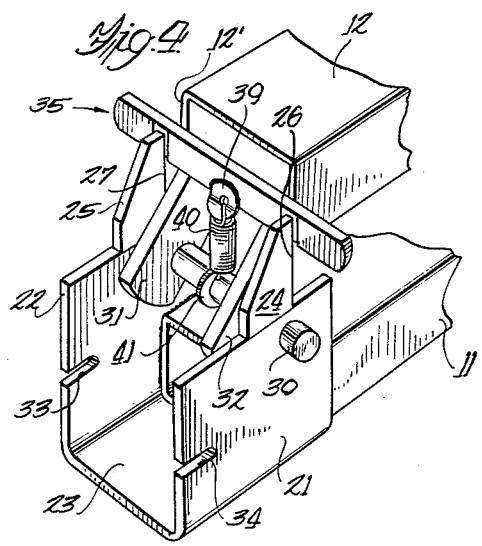
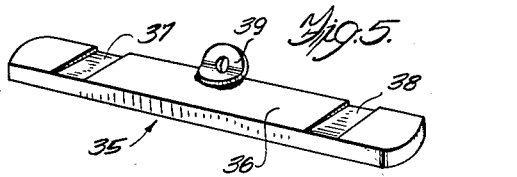
INVENTORS
JAMES MORKOSKI
ARTHUR G. EVANS
Paul O. Pippel
ATTORNEY United States Patent Office 3,123,153
Patented Mar. 3, 1964

3,123,153
DISK HARROW WING LOCKING DEVICE
James Morkoski, Clarendon Hills, and Arthur G. Evans, Wheaton, Ill., assignors to International Harvester Company, Chicago, Ill., a corporation of New Jersey
Filed Jan. 29, 1962, Ser. No. 169,220
5 Claims. (Cl. 172—640)

This invention relates generally to agricultural implements, and more particularly to implements employing a folding frame construction such as disc harrows or the like.

The advantages flowing from the utilization of a folding frame construction in an agricultural implement are many and well known. For example, a wider area of the field may be worked, thus reducing the total number of passes which are required to completely work a field. Also, when conditions of heavy draft are encountered, the extension gang section may be folded onto the main gang section, thus increasing the ground penetrating ability of the main gang section tools. The folding frame construction also allows the implement to be transported along narrow highways, and to pass through restricted openings.

While prior art devices have in general achieved the above enumerated advantages, they have not proved entirely adequate in that satisfactory means for locking the extension gang in both the extended and the folded position, have not been provided. Means have been provided in prior art devices for locking the extension gang in the working or extended position, but these arrangements have not filled the need, since the extension gang has exhibited a tendency to move relative to the main gang section when uneven portions of a field are encountered.

An object of the present invention is therefore, to provide means which rigidly and positively lock the extension gang in the working position, thereby allowing the ground-working tools on the extension gang to penetrate the earth the same depth as the ground-working tools on the main gang section.

Another difficulty which has arisen in prior art devices, is that the locking devices have exhibited a tendency to work themselves loose or even become disengaged while traversing a field. It is therefore a further object of the present invention to provide an implement of the type described with locking means which react to uneven portions of a field to more positively lock the extension gang with respect to the main gang section.

A still further object of the invention is to provide an implement employing a folding frame construction with means for positively and rigidly locking the extension gang in the folded or traveling position.

Other objects and advantages of the present invention will hereinafter become more fully apparent from an examination of the following description and annexed drawings wherein:

FIGURE 1 is a plan view of a disk harrow embodying the present invention;

FIGURE 2 is a view similar to FIGURE 1 on an enlarged scale showing the novel locking mechanism of the present invention;

FIGURE 3 is a side elevational view showing the extension gang in both the working and transport positions;

FIGURE 4 is a perspective view showing the extension gang in the transport position, and FIGURE 5 is a perspective view of the novel wedge used in the present invention.

Referring now to the drawings wherein like reference characters designate like or corresponding parts, there is shown in FIGURE 1 a disk harrow gang 10 having a main gang section 11 and an extension gang section 12. A plurality of ground working disks 13 are mounted at spaced-apart points along extension gang section shaft or arbor 14 and main gang section shaft or arbor 15 respectively. Arbors 14 and 15 are mounted for rotation with respect to frame members 11 and 12 by bearing means supported by bracket assemblies 16 and 17 as is well known in the art.

A U-shaped bracket member 20 having side portions 21 and 22 and a bight portion 23 is mounted on the outwardly extending end of main gang section 11. Bight section 23 projects outwardly from the end of main gang section 11, and supports extension gang section 12 when it is in the extended position as is best seen in FIGURE 3. Side portions 21 and 22 extend above the upper surfaces of sections 11 and 12, and are provided at their upper end with generally vertically extending arm members 24 and 25. Arms 24 and 25 have transversely aligned vertically extending edges 26 and 27, the purpose of which will become hereinafter more fully apparent.

A pivot member 30 extends transversely across main gang section 11, and is mounted adjacent the upper edge of bracket side portions 21 and 22. A pair of apertured lug members 31 and 32 are fixedly secured to the upper surface of extension gang section 12, and are mounted for swinging movement about pivot member 30.

The outwardly extending edge of bracket 20 is provided with slots or grooves 33 and 34, which are located adjacent the upper surface of extension gang section 12 when it is in the extended position, as is best seen in FIGURE 3. A wedge 35 is slidingly engageable with the upper surface of extension gang section 12, and with grooves 33 and 34 to prevent extension gang section 12 from moving relative to main gang section 11.

With particular reference to FIGURE 5, it would be noted that wedge 35 consists of a longitudinally extending rod having flat parallel opposed faces 36, 36. Upper face portion 36 is provided with a pair of spaced apart tapered cut-out portions 37 and 38. From FIGURE 2 it is apparent that tapered portions 37 and 38 are engageable with grooves 33 and 34 respectively. An apertured ear 39 is provided at the intermediate portion of wedge 35, and is adapted to receive one end of spring member 40. The other end of spring member 40 is permanently secured to pivot member 30 by an annularly shaped ring 41. Spring 40 is of such a length that a considerable amount of force must be exerted to hook one end portion into apertured ear 39. As a result when the implement is traversing a field and encounters an uneven or rough portion, causing extension gang section 12 to tend to move relative to main gang section 11, spring 40 will continuously urge wedge 35 into engagement with grooves 33 and 34 to increasingly resist the tendency of the relative movement.

From an examination of FIGURES 3 and 4 it will be apparent that the same wedge 35 that is used to lock the extension gang in the extended position may also be used to lock the extension gang in the folded position. When the extension gang 12 is in the folded position, end portion 12' cooperates with edges 26 and 27 to form a slot or groove for the reception of wedge 35. It should be understood that since tapered portions 37 and 38 engage edges 26 and 27, spring 40 will resiliently urge wedge 35 into locking engagement with end portion 12' when the implement is moved with the extension gang 12 in the folded position.

The foregoing disclosure relates to only a preferred embodiment of the invention and numerous modifications or alterations may be made therein without departing from the spirit or scope of the invention as set forth in the appended claims.

What is claimed is:

1. A locking device for a folding gang implement having at least one main gang section and an extension gang section pivotally mounted on said main gang section for swinging movement from an extended to a folded position comprising, a bracket secured to said main gang section, said bracket having side portions projecting above said main gang section and a base portion extending outwardly from said main gang section, said base portion being adapted to support said extension gang section when said extension gang section is in an extended position, slots in said bracket side portions adjacent the upper surface of said extension gang section when said extension gang section is in the extended position, and a wedge member selectively engageable with said slots and slidingly engageable with said extension gang section upper surface to lock said extension gang section in the extended position.

2. A locking device for a folding gang implement having at least one main section and an extension gang section pivotally mounted on said main gang section for swinging movement from an extended to a folded position comprising, a bracket secured to said main gang section, said bracket having side portions projecting above said main gang section and a base portion extending outwardly from said main gang section, said base portion being adapted to support said extension gang section when said extension gang section is in an extended position, slots in said bracket side portions adjacent the upper surface of said extension gang section when said extension gang section is in the extended position, a wedge member selectively engageable with said slots and slidingly engageable with said extension gang section upper surface to lock said extension gang section in the extended position, and a pair of arms mounted on and extending above said bracket side portions, said arms having at least one transversely aligned edge, said edges being spaced from the inner end of said extension gang section when said extension gang section is in the folded position to form a slot adapted to selectively receive said wedge, said wedge and said last mentioned slot cooperating to lock said extension gang in the folded position.

3. The invention set forth in claim 2 wherein said wedge is a longitudinally extending member of generally uniform thickness having tapered portions engageable with said slots.

4. A locking device for a folding gang implement having at least one main gang section and an extension gang section pivotally mounted on said main gang section for swinging movement from an extended to a folded position comprising, a slotted bracket fixedly secured to said main gang section, pivot means on said bracket having said extension gang section associated therewith, arm members on said bracket having at least one transversely aligned edge, a wedge selectively engageable with said bracket slots and said extension gang section when said extension gang section is in the extended position to lock said extension gang section in this position, said wedge being selectively engageable with said aligned edges of said arms and said extension gang section when said extension gang section is in the folded position to lock it in this position.

5. The invention set forth in claim 4 wherein spring means are associated with said pivot member and are connectable with said wedge to resiliently urge it in locking engagement with said extension gang section.

References Cited in the file of this patent

UNITED STATES PATENTS

| | | |
|---|---|---|
| 2,594,533 | Baker | Apr. 29, 1952 |
| 2,972,385 | Walberg | Feb. 21, 1961 |